United States Patent
Lembo (12)

(10) Patent No.: US 7,021,084 B2
(45) Date of Patent: Apr. 4, 2006

(54) INSULATION SHIELDING FOR GLASS FIBER MAKING EQUIPMENT

(75) Inventor: Michael J. Lembo, Souderton, PA (US)

(73) Assignee: Certainteed Corporation, Valley Forge, PA (US)

(*) Notice: Subject to any disclaimer, the term of this patent is extended or adjusted under 35 U.S.C. 154(b) by 478 days.

(21) Appl. No.: 10/314,593

(22) Filed: Dec. 9, 2002

(65) Prior Publication Data

US 2004/0107737 A1    Jun. 10, 2004

(51) Int. Cl.
*C03B 37/05* (2006.01)
*H05B 6/06* (2006.01)

(52) U.S. Cl. .................. 65/516; 219/647; 219/649; 219/668; 65/484; 425/8

(58) Field of Classification Search .......... 65/521–523, 65/471, 103, 516–518; 219/600; 425/8; 264/8; 373/152–154, 160; 118/715
See application file for complete search history.

(56) References Cited

U.S. PATENT DOCUMENTS

| 3,636,293 | A | * | 1/1972 | Schneider et al. | 219/634 |
| 3,850,205 | A | * | 11/1974 | Frailly | 140/88 |
| 4,333,626 | A | * | 6/1982 | Holbrook | 248/689 |
| 5,052,597 | A | * | 10/1991 | Bruckner | 222/593 |
| 5,821,504 | A | * | 10/1998 | Sprenger et al. | 219/635 |
| 5,877,471 | A | * | 3/1999 | Huhn et al. | 219/121.49 |
| 6,221,782 | B1 | * | 4/2001 | Shan et al. | 438/710 |

* cited by examiner

*Primary Examiner*—Steven P. Griffin
*Assistant Examiner*—Lisa L. Herring
(74) *Attorney, Agent, or Firm*—Duane Morris LLP

(57) ABSTRACT

An energy-efficient inductive heater operable to heat a rotary glass fiber discharging spinner. The heater includes shielding disposed between the induction coil and the metal guard plates of the heater. The shielding may comprise any electrically insulative or dielectric material that is capable of withstanding the high operating temperatures occurring in a glass making environment.

4 Claims, 2 Drawing Sheets

INSULATION SHIELDING FOR GLASS FIBER MAKING EQUIPMENT

FIELD OF THE INVENTION

The present invention relates in general to glass fiber making equipment and in particular to insulation shielding for an inductive heater operable to heat a rotary glass fiber discharging spinner.

BACKGROUND OF THE INVENTION

A variety of technologies are known for heating the constituents of glass to a homogenous molten state and maintaining glass in that state as it is being processed into products. Prominent among these technologies are inductive heating systems and methods. This is because the silicon that is present as silica in sand (the primary constituent of glass) is semi-conductive and therefore susceptible to electronic induction. Inductive furnaces may be used to initially melt the raw materials of glass into a liquefied state and inductive heaters may be used to heat the spinners that rotate at high velocity and centrifugally discharge multiple fibers of molten glass which are cooled and further processed into end products such as glass fiber insulation.

While effective for heating rotary glass spinners, currently available induction heaters produce waste heat that reduces their efficiency. In order to inductively heat a typical glass spinner, electrical power is consumed in the medium frequency (MF) rings of the heater. However, there is considerable additional conductive metal in the immediate vicinity of the MF rings and spinner including, without limitation, the guard plates surrounding the MF rings. During operation of the heater, this metal is also inductively heated, thereby resulting in consumption of electrical power. The power that is required to produce this waste heat reduces the efficiency of the heater and increases its cost of operation. These increased operational costs in turn increase the cost of the end products of the glass making process and reduce the profit that can be realized from their sale.

An advantage exists, therefore, for an energy-efficient inductive heater operable to heat a rotary glass fiber discharging spinner.

SUMMARY OF THE INVENTION

The present invention provides an energy-efficient inductive heater operable to heat a rotary glass fiber discharging spinner. In particular, the invention includes shielding disposed between the induction coil and the metal guard plates of the heater. The shielding may comprise any electrically insulative or dielectric material that is capable of withstanding the high operating temperatures occurring in a glass making environment. The shielding inhibits inductive heating of the metal guard plates during operation of the heater, thereby reducing the electrical power that is required to maintain the spinner and molten glass therein at a desired working temperature. The reduced consumption of electrical power is translated into operational cost savings that can be used to reduce the cost of the end products of the glass making process and increase the profit that can be realized from their sale.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
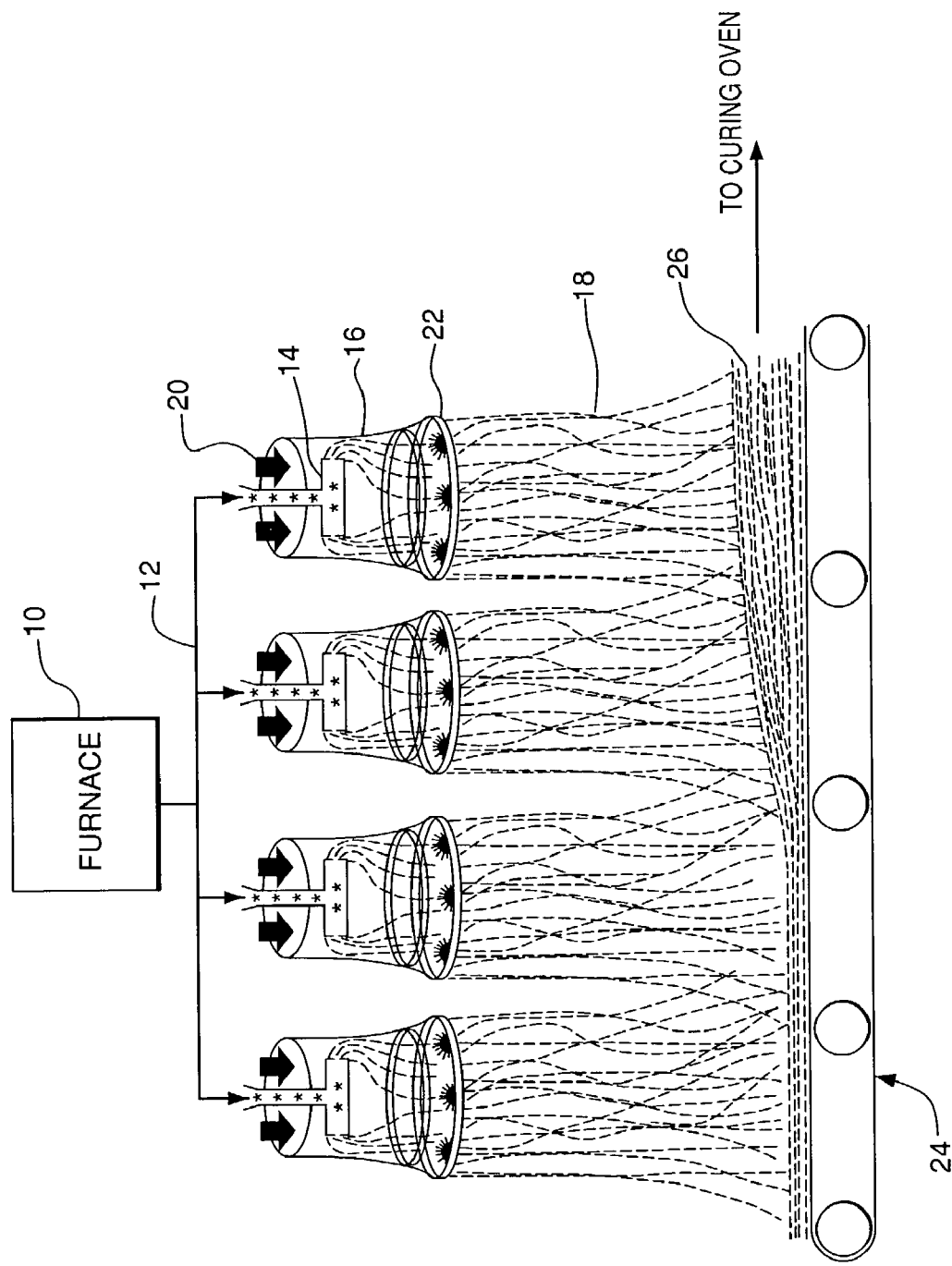
FIG. 1 is a schematic view of a typical glass fiber spin process.

Referring to FIG. 1, a typical glass fiber spin process begins at a melting furnace 10 which melts raw glass materials including sand and other constituents such as feldspar, sodium sulfate, anhydrous borax, boric acid, among many others. The molten glass is temperature regulated to a precise viscosity and delivered from furnace 10 by conduit 12 to the intakes of one or more rotary spinners 14 each of which reside in a heating chamber 16 such as that established by the inductive heater described in connection with FIG. 2. As is known, spinners 14 are rotated at high speed by an unillustrated rotational drive means. The spinners may be cylindrical or disk-shaped and include a plurality of peripheral holes through which fibers of molten glass 18 are centrifugally discharged as the spinners rotate at high velocity. As indicated by arrows 20, hot, high velocity attenuation air may be blown into the intakes of the heating chambers. The attenuation air stretches the fibers to the point of breaking. As the fibers are created they are sprayed with a resin binder by a spraying apparatus 22 and are collected on a moving conveyor 24 where they form a mat 26. The mat is delivered by the conveyor to an unillustrated curing oven which heats and cures the resin binder.

Figure 2:
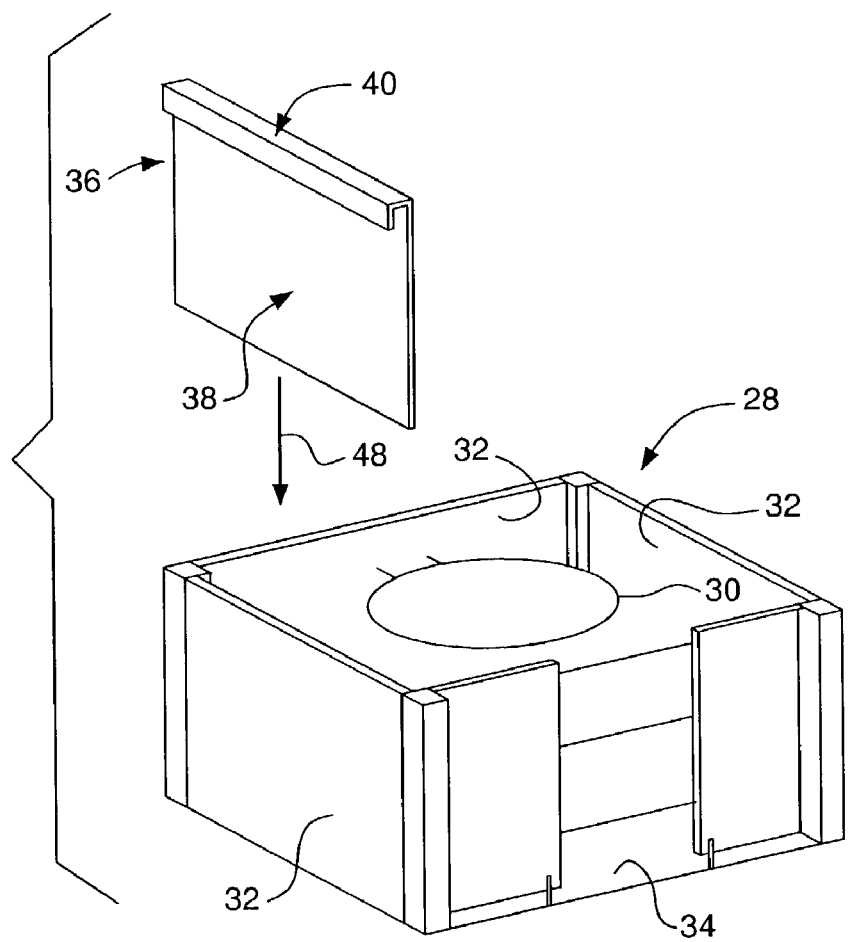
FIG. 2 is an exploded perspective view of a inductive heater operable to heat a rotary glass fiber discharging spinner and electrically insulative shielding therefor.

FIG. 2 shows a conventional inductive heater 28 including a plurality of MF rings 30 (only one of which is shown). The MF rings form an induction coil that is subjected to alternating electrical current from an unillustrated electrical power source to establish the heating chamber 16 of FIG. 1. The current flowing through MF rings 30 generates an alternating magnetic field that produces an electrical current in the rotating spinner 14 and glass contained therein. The current induced in the spinner and glass serves to keep the molten glass at a desired velocity as it is discharged from spinner 14.

The typical rotary spinner inductive heater includes thick metal guard plates 32 on at least three sides thereof. The fourth side 34 is not normally fitted with guard plates to enable servicing of the inductive heater and maintenance or removal of spinner 14 (not shown in FIG. 2 for clarity of illustration). The typical guard plate is about 52 inches in length, 36 inches in height and about ½ inch in thickness. The guard plates 32 protect the operating components of heater 28 from damage while shielding human workers from the magnetic field generated by the MF rings. As discussed hereinabove, because they are susceptible to inductive heating, the guard plates 32 constitute a considerable power drain on the power source during operation of heater 28.

Figure 3:
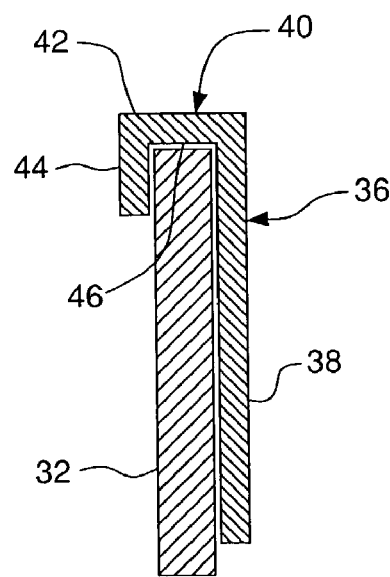
FIG. 3 is a side elevation view of a presently preferred embodiment of the electrically insulative shielding according to the invention in assembled condition with a guard plate of the induction heater of FIG. 3.

FIGS. 2 and 3 illustrate a presently preferred embodiment of electrically insulative shielding 36 in accordance with the invention. Shielding 36 is manufactured to provide a panel portion 38 preferably dimensioned to substantially cover the interior surface area of a guard plate 32 of inductive heater 28. Shielding 36 further comprises means 40 for connecting panel portion 38 to guard plate 32. According to a preferred embodiment, connecting means 40 comprises a hanger-type configuration extending the length of panel portion 38 which includes a flange 42 projecting from an upper edge of panel portion 38 and a downwardly-directed lip 44 depending from the flange. Together, flange 42 and lip 44 define a pocket or channel 46 for receiving the upper edge of guard plate 32. It will be understood, however, that connecting means 40 may also assume other forms such as a plurality of hanger members disposed along the upper edge of panel portion 38 that may be integral with or detachable from the panel portion. As depicted in FIG. 2, a worker installs shielding 36 by lowering it in the direction of arrow 48 such that the panel portion 38 is positioned between the MF rings 30 and the guard plate 32.

At least the panel portion 38 of shielding 36 (or all of the shielding if the connecting means 40 is made the same material as the panel portion) is fabricated from a non-conductive or low-conductivity dielectric material. Depending upon the chosen dielectric material, panel portion 38 may range from about ⅛-¼ inch in thickness. It also may be reinforced with non-conductive fabric or fibrous material such as aromatic ployamide fiber (KEVLAR®) for enhanced strength and durability.

Suitable dielectric materials include artificial materials such as nylon, polytetrafluoroethylene (PTFE or TEFLON®), silicone rubber, chlorosulfonated polyethylene (HYPALON®), polyetherimide, thermoplastic elastomer (SANTOPRENE®), and calcium silicate board (TRANSITE®), as well as natural dielectrics such as muscovite and phlogopite mica. In addition, the dielectric materials must is capable of withstanding the high operating temperatures (typically at least 300° F.) occurring in a glass making environment.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. An apparatus for making glass fibers, comprising:
   a spinner spinning molten glass into molten glass fibers;
   an induction heater having metal guard plates and AC induction coils that surround the spinner and the molten glass;
   the shielding forming an enclosure at least partially surrounding the AC induction coils;
   the shielding comprising:
   a panel portion fabricated from an electrically insulative material dimensioned to substantially cover at least one of said metal guard plates of the induction heater; and
   means for connecting said panel portion to an upper edge of the at least one of said metal guard plates of the induction heater such that said panel portion is disposed between the induction coil and the metal guard plate when the panel portion is connected to the metal guard plate, wherein the electrically insulative material is connected to the at least one of said metal guard plates, said means comprising, said electrically insulative material having a pocket or channel receiving the upper edge of the at least one of said metal guard plates.

2. The apparatus according to claim 1, further comprising; a non-conductive, fabric or fibrous material, reinforcing the electrically insulative material.

3. An apparatus for making glass fibers, comprising:
   a spinner spinning molten glass into molten glass fibers
   an induction heater having metal guard plates and AC induction coils that surround the spinner and the molten glass;
   the shielding forming an enclosure at least partially surrounding the AC induction coils;
   the shielding comprising:
   a panel portion fabricated from an electrically insulative material dimensioned to substantially cover at least one of said metal guard plates of the induction heater; and
   means for connecting said panel portion to an upper edge of the at least one of said metal guard plates of the induction heater such that said panel portion is disposed between the induction coil and the metal guard plate when the panel portion is connected to the metal guard plate, wherein the electrically insulative material is connected by said means comprising, a hanging connection to the at least one of said metal guard plates.

4. The apparatus according to claim 3, further comprising; a non-conductive, fabric or fibrous material, reinforcing the electrically insulative material.

* * * * *